US007668903B2

(12) United States Patent
Edwards et al.

(10) Patent No.: US 7,668,903 B2
(45) Date of Patent: Feb. 23, 2010

(54) METHOD AND APPARATUS FOR DYNAMICALLY DELIVERING SERVICE PROFILES TO CLIENTS

(75) Inventors: Warren Keith Edwards, San Francisco, CA (US); Mark Webster Newman, San Francisco, CA (US); Trevor Fredrick Smith, San Francisco, CA (US); Jana Zdislava Sedivy, Palo Alto, CA (US); Karen Marcelo, San Francisco, CA (US); Shahram Izadi, Surbiton (GB); Jason I. Hong, Berkeley, CA (US)

(73) Assignee: Xerox Corporation, Norwalk, CT (US)

( * ) Notice: Subject to any disclaimer, the term of this patent is extended or adjusted under 35 U.S.C. 154(b) by 827 days.

(21) Appl. No.: 10/616,049

(22) Filed: Jul. 7, 2003

(65) Prior Publication Data
US 2005/0010655 A1 Jan. 13, 2005

(51) Int. Cl.
*G06F 15/16* (2006.01)
(52) U.S. Cl. .................. 709/203; 709/217; 709/218; 709/219; 709/223; 709/224
(58) Field of Classification Search ............. 709/203, 709/216, 217–219, 223–224
See application file for complete search history.

(56) References Cited

U.S. PATENT DOCUMENTS 6,421,716 B1 *  7/2002  Eldridge et al. ............ 709/219
6,909,721 B2 *  6/2005  Ekberg et al. .............. 370/401
6,970,869 B1 * 11/2005  Slaughter et al. ............ 707/10
7,102,640 B1 *  9/2006  Aholainen et al. .......... 345/440
7,103,351 B2 *  9/2006  Chaudhari et al. ....... 455/414.1
7,107,330 B1 *  9/2006  Hamilton et al. ........... 709/221
7,127,209 B2 * 10/2006  Mooney ................... 455/41.2
7,324,462 B1 *  1/2008  Page et al. ................. 370/255
2002/0012329 A1 *  1/2002  Atkinson et al. ........... 370/330
2002/0083121 A1 *  6/2002  Chang et al. ............... 709/201
2002/0156795 A1   10/2002  Edwards et al. ............ 707/103
2003/0045275 A1 *  3/2003  McDonagh et al. ........ 455/414
2003/0054794 A1 *  3/2003  Zhang ....................... 455/403
2003/0158952 A1 *  8/2003  Fleming et al. ............ 709/230
2004/0203358 A1 * 10/2004  Anderson et al. ......... 455/41.1
2005/0125564 A1 *  6/2005  Bushmitch et al. ......... 709/250
2006/0031435 A1 *  2/2006  Tindal ....................... 709/220

OTHER PUBLICATIONS

Design with dynamic extensions, Bill Venners, JavaWorld.com, Jan. 1, 1999.*

* cited by examiner

*Primary Examiner*—Shawki S Ismail
(74) *Attorney, Agent, or Firm*—Park, Vaughan & Fleming LLP

(57) ABSTRACT

One embodiment of the present invention provides a system that facilitates dynamic delivery of service profiles to a client. During operation, the system performs a discovery operation to allow the client to discover new services on a network. If a new service is discovered for which the client does not possess a service profile, the client to obtains the service profile from the new service and subsequently installs it, thereby enabling the client to interact with the new service.

29 Claims, 2 Drawing Sheets

METHOD AND APPARATUS FOR DYNAMICALLY DELIVERING SERVICE PROFILES TO CLIENTS

RELATED APPLICATION

The subject matter of this application is related to the subject matter in a co-pending non-provisional application by Warren Keith Edwards, Mark Webster Newman and Jana Zdislava Sedivy and filed 20 Apr. 2001, entitled, "System and Method for Enabling Communication Among Arbitrary Components," having Ser. No. 09/838,933.

BACKGROUND

1. Field of the Invention

The present invention relates to techniques for providing interoperability between devices on a network.

2. Related Art

The increasing sophistication of small computing devices and corresponding advances in wireless networking technology are creating a world in which devices as diverse as personal digital assistants (PDAs) and stereo systems are able to interact with each other. A number of standards have been developed to facilitate these interactions. In particular, the BLUETOOTH™ wireless specification provides a standard that enables disparate wireless devices to interoperate with each other.

The Bluetooth wireless specification defines "devices profiles" for a large number of different devices. These device profiles specify how to use services provided by the corresponding devices. For example, a device profile for a printer can specify a protocol that allows a client to use the printer. In order to use the printer, the client first installs an implementation of the device profile. (Note that the terms "device" and "service" and the terms "device profile" and "service profile" are used interchangeably throughout this specification. Although in some instances the term "service" may be a more generic term, since—from a networking point of view—a service can be a device or something that's purely software.)

Standards such as Bluetooth have been successful in facilitating interoperability between devices provided by different vendors. However, there is often a considerable delay between the time the initial implementation of a new device profile is developed and the time when the new device profile becomes accepted as part of the standard. This delay can lead to a slow "lock-step" evolution process for device profiles. In the intervening time before a new device profile is accepted into the standard, only the company that developed the device profile is able to make use of it, which defeats the main advantage of using a standard. Moreover, by the time the new device profile is accepted into the standard, a newer more advanced profile may have been developed. Hence, the delay in accepting device profiles into the standard can cause devices profiles in the standard to continually lag behind the state of the art.

Furthermore, portable devices, such as PDAs and cell phones, typically encode device profiles in Read-Only Memory (ROM). This means that when new device profiles become available, existing portable devices are unable to make use of them. The existing portable devices are often simply discarded in order to be replaced with new devices that include the new device profiles. Although this rapid obsolescence of portable devices can greatly benefit device manufacturers, it is bothersome and expensive for device owners.

Hence, what is needed is a method and an apparatus that facilitates updating devices profiles without the problems described above.

SUMMARY

One embodiment of the present invention provides a system that facilitates dynamic delivery of service profiles to a client. During operation, the system performs a discovery operation to allow the client to discover new services on a network. If a new service is discovered for which the client does not possess a service profile, the client to obtains the service profile from the new service and subsequently installs it, thereby enabling the client to interact with the new service.

In a variation on this embodiment, the client obtains the service profile from the new service by sending a request for the service profile to the new service, and then receiving the service profile from the new service.

In a variation on this embodiment, the service profile includes code, and installing the service profile on the client involves installing the code on the client.

In a variation on this embodiment, the service profile includes a specification that describes how to use the new service, and installing the service profile on the client involves, generating code to implement the specification, and then installing the code on the client.

In a variation on this embodiment, the service profile is encoded in a universal form that can be executed by different types of clients.

In a variation on this embodiment, there exist different service profile implementations for different types of clients. In this variation, the client obtains the service profile by: communicating characteristics of the client to the new service: allowing the new service to select a service profile implementation for the client based on the characteristics; and then allowing the new service to send the selected service profile implementation to the client.

In a variation on this embodiment, the client obtains the service profile from the new service by executing a dynamic extension profile, which implements a standard protocol that enables the client to acquire any profile the client needs at the time the profile is needed.

In a variation on this embodiment, the client and the new service communicate using the Bluetooth networking standard, and initial the discovery operation involves using the Bluetooth Service Discovery Protocol (SDP).

In a variation on this embodiment, the service profile can define a service-specific Application Programming Interface (API).

In a variation on this embodiment, the service profile implements a domain-specific protocol stack associated with the new service.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Wireless Devices

Figure 1:
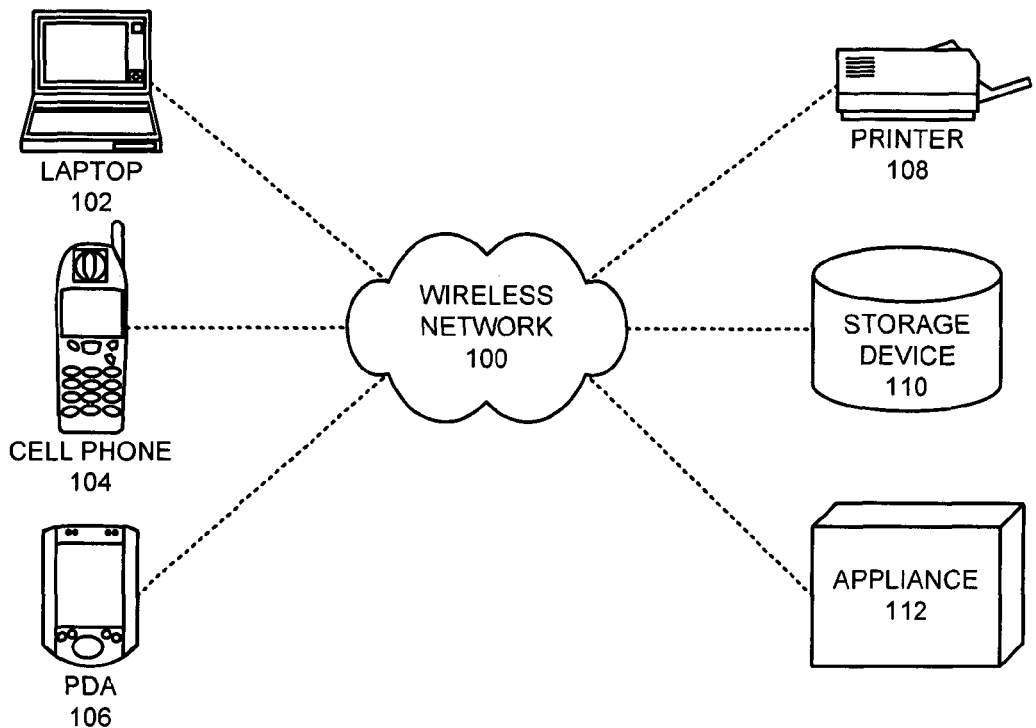
FIG. 1 illustrates a number of wireless devices that communicate with each other through a wireless network in accordance with an embodiment of the present invention.

FIG. 1 illustrates a number of wireless devices that communicate with each other through a wireless network 100 in accordance with an embodiment of the present invention. These wireless devices includes laptop 102, cell phone 104, personal digital assistant (PDA) 106, printer 108, storage device 110 and appliance 112. Note that appliance 112 can include any type of household or other type of appliance. Wireless network 100 can include any type of wireless network, including networks that use optical signals (such as infrared signals), Radio Frequency (RF) signals or any other type of wireless signaling techniques.

The wireless devices illustrated in FIG. 1 can be divided into wireless clients, namely cell laptop 102, cell phone 104 and PDA 106, and wireless service providers, namely printer 108, storage device 110 and appliance 112. In general, wireless clients use services provided by wireless service providers. For example, PDA 106 can use a print service provided by printer 108 to print a document, and laptop 102 can use a data storage service provided by storage device 110 to store data. However, note that the distinction between wireless clients and wireless service providers is somewhat artificial because in some situations printer 108, storage device 110 and appliance 112 can possibly act as wireless clients, and laptop 102, cell phone 104 and PDA 106 can possibly act as wireless service providers.

Furthermore, although the present invention is described in the context of a wireless network, in general, the present invention can be used with devices on any type of wire-based or wireless communication channel capable of coupling together computing nodes. This includes, but is not limited to, a local area network, a wide area network, or a combination of networks.

Each of the wireless devices illustrated in FIG. 1 includes a computing engine with a memory that is able to run implementations of device profiles as is described below with reference to FIGS. 2 and 3.

Profiles

Figure 2:
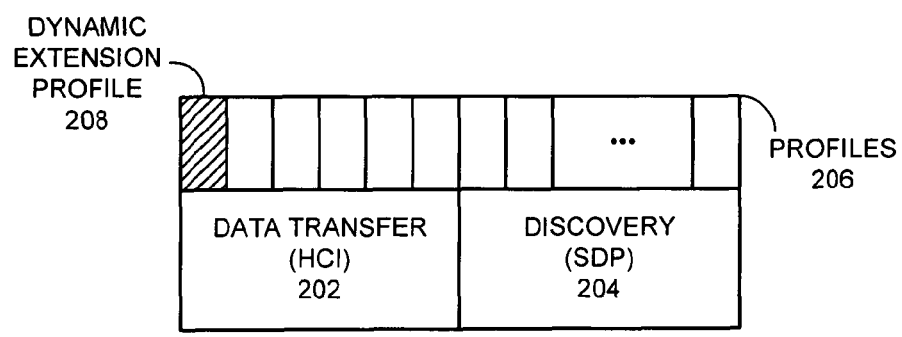
FIG. 2 illustrates how device profiles are installed within a device in accordance with an embodiment of the present invention.

FIG. 2 illustrates how a number of device profiles 206 are installed within a device in accordance with an embodiment of the present invention. In general, device profiles can be defined for a large number of different devices and associated services. For example, device profiles can be created for, personal computers, workstations, printers, telephones, cell phones, headsets, PDAs, laptops, keyboards, mice, automobile components, network gateways, monitors, projectors, televisions, VCRs, and audio components, such as DVD players and receivers.

A device profile may be comprised of code. For example, it may represent a Java object and its implementation, which are serialized and downloaded to the client. Upon reception of this object, the client would deserialize it, whereupon it would be available for use by applications and other code running on the client. As the client interacts with the operations provided by this Java representation of the profile, the downloaded Java code would invoke the remote service.

Alternatively, a device profile may be comprised of "native" code, intended to be used directly by the operating system or arbitrary applications. For example, a video camera might provide a number of drivers for use on different platforms. Once received by a client, such a driver would be integrated into the client operating system, making it available for use by all applications running on the client.

Alternatively, a device profile may comprise a set of declarative specifications, enumerating the operations available in the device profile. For example, it may comprise a Web Services Description Language (WSDL) declaration of the operations available on the service, their parameters, and their return types. Client-side "wrapper" code could be generated upon receipt of such a specification, allowing applications and other code to interact with the service.

Referring to FIG. 2, device profiles 206 operate over a baseline Bluetooth system. This baseline system provides data transfer capabilities through a data transfer mechanism 202, which implements the Bluetooth Host Controller Interface (HCI). The baseline system also provides service discovery capabilities through the Bluetooth Service Discovery Protocol (SDP). This service discovery protocol enables a device to determine whether another device provides a specific service.

One of devices profiles 206 is a special "dynamic extension" profile 208, which allows the device to dynamically load other profiles. In a sense, this is a "profile to end all profiles," because it facilitates the dynamic acquisition of profiles as they are needed. Dynamic extension profile 208 is fairly simple. It provides commands that allow a first device to query second device to determine which profile implementations are available on the second device. It also provides commands to transfer profile implementations from the second device to the first device.

Note that for dynamic extensibility purposes, it is desirable for the device profile to be in a form that can be universally executed on all clients. Alternatively, multiple implementations can be provided for different device platforms (one for WINDOWS™, one for MACINTOSH™, and so on).

Process of Loading a Profile

Figure 3:
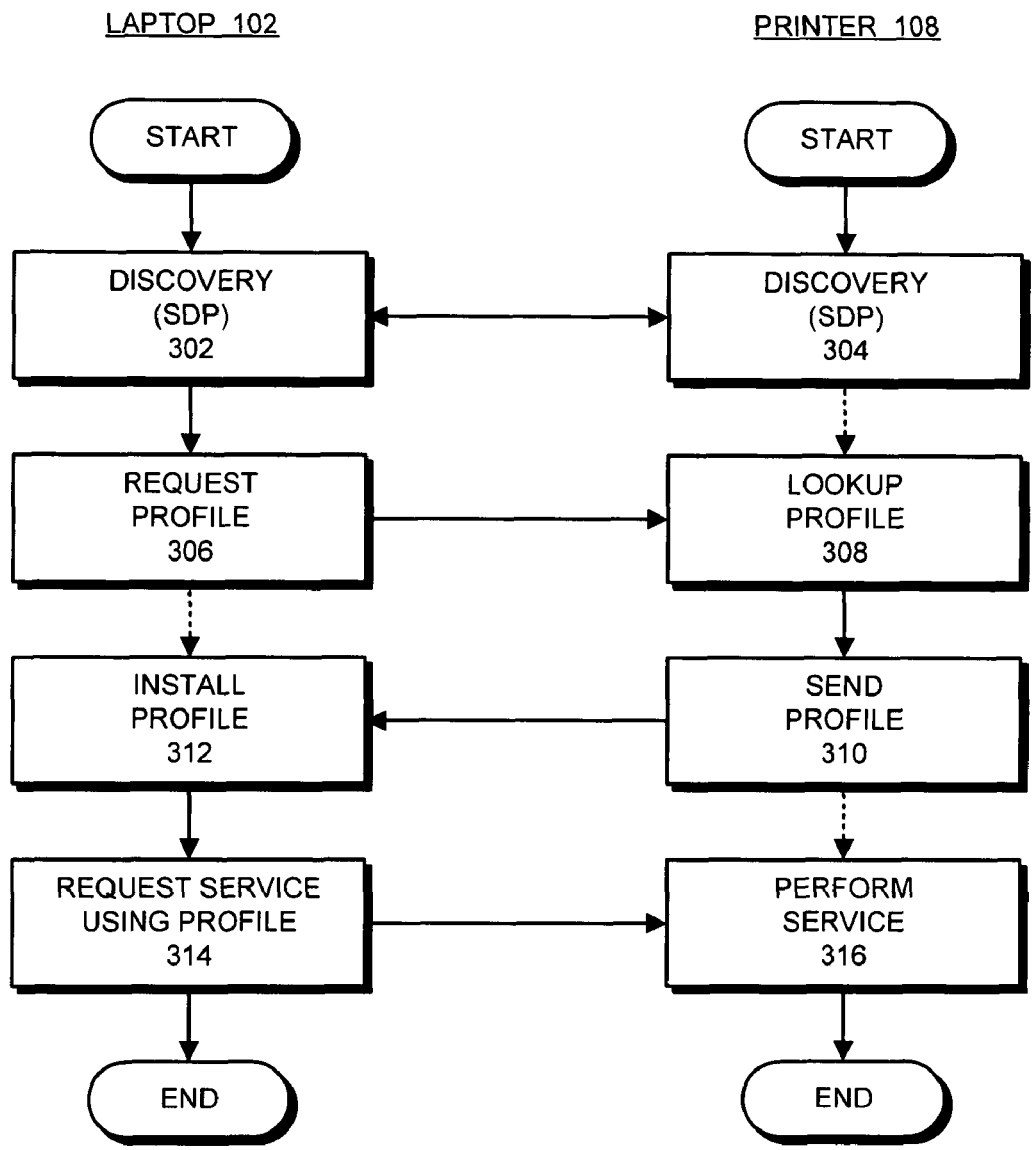
FIG. 3 presents a flow chart illustrating the process of dynamically loading a profile into a device in accordance with an embodiment of the present invention.

FIG. 3 presents a flow chart illustrating the process of dynamically loading a profile into a device in accordance with an embodiment of the present invention. In this example, a laptop 102 dynamically loads a profile from a printer 108.

At the beginning of the process, laptop 102 and printer 108 both execute a service discovery protocol, such as Bluetooth SDP (steps 302 and 304). During this service discovery protocol, laptop 102 and printer 108 discover each other, and they also learn about which device profiles they each support.

Next, suppose laptop 102 requires a device profile from printer 108. In order to obtain this device profile, laptop 102 requests the profile from printer 108 (step 306). Along with this request, laptop 102 can send type information that identifies what type of device platform exists within laptop 102. For example, laptop 102 can say that it is running the Windows operating system.

Next, printer 108 looks up a profile implementation based on the type information (step 308), and sends the profile implementation to laptop 102 (step 310).

In an alternative embodiment of the present invention, printer 108 does not lookup a platform-specific implementation of a device profile. Instead, printer 108 sends a "universal" device profile to laptop 102 that can be executed by different types of clients. In yet another alternative embodiment, printer 108 sends a bundle containing a number of different device profile implementations to laptop 102, and laptop 102 selects an implementation that is appropriate for its underlying device platform.

After receiving the device profile, laptop 102 installs it (step 312). In one embodiment of the present invention, the device profile contains code (such as a driver), and the installation process involves installing the code in laptop 102. In another embodiment of the present invention, the device profile provides a specification that describes how to use a service provided by printer 108, and installing the device profile involves generating code within laptop 102 to implement the specification, and then installing the code in laptop 102.

After the device profile has been installed in laptop 102, laptop 102 is able to request a service using the device profile (step 314). For example, laptop 102 can make a request to printer 108 to print a document. In response to this request, printer 108 performs the service (step 316), which in this example involves printing a document. Note that performing a service may entail a number of interactions between laptop 102 and printer 108, and these interactions are not illustrated in FIG. 3.

The present invention not only allows clients to obtain implementations of standard profiles that they weren't initially configured to use, but it also allows clients to obtain arbitrary device-specific protocol stacks. This capability can potentially be used to subvert the standards process, because it means that device manufacturers no longer have to agree to ratify a standard profile to ensure interoperability. Instead a developer can create a "one off" profile that can be used to communicate with a particular device. This device can then transfer the protocol to any clients it needs to communicate with through the dynamic extension protocol. Also note that a new device profile can define a device-specific Application Programming Interface (API) for the client that is unlike other APIs presently used by the client.

Furthermore, although the present invention is described in terms of Bluetooth device profiles, the present invention is not meant to be limited to Bluetooth device profiles. In general, the present invention can be used with any type of protocol or other type of interaction specification, not just implementations of Bluetooth device profiles.

Moreover, although this specification describes a system that operates on profiles for devices, the present invention also applies to systems that operate on profiles for services, such as Universal Plug'n'Play services or Block Extension Exchange Protocol (BEEP) services.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method that facilitates dynamic delivery of service profiles to a client, comprising:
   performing a discovery operation to allow the client to discover new services on a network;
   if a new service is discovered for which the client does not possess a service profile for the new service, causing the client to obtain the service profile from a service provider of the new service;
   wherein causing the client to obtain the service profile involves:
      causing the client to send a request for the service profile to the service provider of the new service, wherein the request includes type information identifying the type of device platform of the client; and
      causing the service provider to select the service profile from a set of service profiles based on the received type information of the client; and
   causing the service profile to be installed on the client to enable the client to use the new service,
   wherein the service profile includes a specification that describes how to use the new service, and wherein causing the service profile to be installed on the client involves,
      causing device-specific code to be generated to implement the specification, and
      causing the code to be installed on the client; and
   wherein the service profile is a dynamic extension profile, which provides commands that:
      allow the client to query the service provider to determine which service profiles are available on the service provider; and
      transfer the service profile from the service provider to the client.

2. The method of claim 1, wherein causing the client to obtain the service profile involves:
   causing the client to send a request for the service profile to the service provider of the new service; and
   causing the client to receive the service profile from the service provider of the new service.

3. The method of claim 1, wherein the service profile includes code, and wherein causing the service profile to be installed on the client involves causing the code to be installed on the client.

4. The method of claim 1, wherein the service profile is encoded in a universal form that can be executed by different types of clients.

5. The method of claim 1,
   wherein there exist different service profile implementations for different types of clients; and
   wherein causing the client to obtain the service profile involves,
      communicating characteristics of the client to the service provider of the new service,
      allowing the service provider of the new service to select a service profile implementation for the client based on the characteristics of the client, and
      allowing the service provider of the new service to send the selected service profile implementation to the client.

6. The method of claim 1, wherein causing the client to obtain the service profile from the service provider of the new service involves executing a dynamic extension profile, which implements a standard protocol that enables the client to acquire any profile the client needs at the time the profile is needed.

7. The method of claim 1,
wherein performing the discovery operation involves using the Bluetooth Service Discovery Protocol (SDP); and
wherein the client and the service provider of the new service communicate using the Bluetooth networking standard.

8. The method of claim 1, wherein the service profile can define a service-specific Application Programming Interface (API).

9. The method of claim 1, wherein the service profile implements a domain-specific protocol stack associated with the new service.

10. A computer-readable storage medium storing instructions that when executed by a computer cause the computer to perform a method that facilitates dynamic delivery of service profiles to a client, the method comprising:
performing a discovery operation to allow the client to discover new services on a network;
if a new service is discovered for which the client does not possess a service profile for the new service, causing the client to obtain the service profile from a service provider of the new service;
wherein causing the client to obtain the service profile involves:
causing the client to send a request for the service profile to the service provider of the new service, wherein the request includes type information identifying the type of device platform of the client; and
causing the service provider to select the service profile from a set of service profiles based on the received type information of the client; and
causing the service profile to be installed on the client to enable the client to use the new service,
wherein the service profile includes a specification that describes how to use the new service, and wherein causing the service profile to be installed on the client involves,
causing device-specific code to be generated to implement the specification, and
causing the code to be installed on the client;
wherein the service profile is a dynamic extension profile, which provides commands that:
allow the client to query the service provider to determine which service profiles are available on the service provider; and
transfer the service profile from the service provider to the client.

11. The computer-readable storage medium of claim 10, wherein causing the client to obtain the service profile involves:
causing the client to send a request for the service profile to the service provider of the new service; and
causing the client to receive the service profile from the service provider of the new service.

12. The computer-readable storage medium of claim 10, wherein the service profile includes code, and wherein causing the service profile to be installed on the client involves causing the code to be installed on the client.

13. The computer-readable storage medium of claim 10, wherein the service profile is encoded in a universal form that can be executed by different types of clients.

14. The computer-readable storage medium of claim 10,
wherein there exist different service profile implementations for different types of clients; and
wherein causing the client to obtain the service profile involves,
communicating characteristics of the client to the service provider of the new service,
allowing the service provider of the new service to select a service profile implementation for the client based on the characteristics of the client, and
allowing the service provider of the new service to send the selected service profile implementation to the client.

15. The computer-readable storage medium of claim 10, wherein causing the client to obtain the service profile from the service provider of the new service involves executing a dynamic extension profile, which implements a standard protocol that enables the client to acquire any profile the client needs at the time the profile is needed.

16. The computer-readable storage medium of claim 10,
wherein performing the discovery operation involves using the Bluetooth Service Discovery Protocol (SDP); and
wherein the client and the service provider of the new service communicate using the Bluetooth networking standard.

17. The computer-readable storage medium of claim 10, wherein the service profile can define a service-specific Application Programming Interface (API).

18. The computer-readable storage medium of claim 10, wherein the service profile implements a domain-specific protocol stack associated with the new service.

19. An apparatus that facilitates dynamic delivery of service profiles to a client, comprising;
a device configured to provide a service;
a memory within the device containing the service profile that enables clients to use the service provided by the device;
a discovery mechanism configured to perform a discovery operation that allows the client to discover new services on a network;
a profile transfer mechanism, wherein if a new service is discovered for which the client does not possess a service profile for the new service, the profile transfer mechanism is configured to cause the service profile to be transferred from a service provider of the new service to the client;
wherein causing the client to obtain the service profile involves:
causing the client to send a request for the service profile to the service provider of the new service, wherein the request includes type information identifying the type of device platform of the client; and
causing the service provider to select the service profile from a set of service profiles based on the received type information of the client; and
an installation mechanism configured to cause the service profile to be installed on the client to enable the client to use the new service,
wherein the service profile includes a specification that describes how to use the new service, and wherein the installation mechanism is configured to,
cause device-specific code to be generated to implement the specification, and
cause the code to be installed on the client; wherein the service profile is a dynamic extension profile, which provides commands that:

allow the client to query the service provider to determine which service profiles are available on the service provider; and transfer the service profile from the service provider to the client.

20. The apparatus of claim 19, wherein the profile transfer mechanism is configured to:
cause the client to send a request for the service profile to the service provider of the new service; and to
cause the client to receive the service profile from the service provider of the new service.

21. The apparatus of claim 19, wherein the service profile includes code, and wherein the installation mechanism is configured to cause the code to be installed on the client.

22. The apparatus of claim 19, wherein the service profile is encoded in a universal form that can be executed by different types of clients.

23. The apparatus of claim 19,
wherein there exist different service profile implementations for different types of clients; and
wherein the profile transfer mechanism is configured to,
communicate characteristics of the client to the service provider of the new service,
allow the service provider of the new service to select a service profile implementation for the client based on the characteristics of the client, and to
allow the service provider of the new service to send the selected service profile implementation to the client.

24. The apparatus of claim 19, wherein the profile transfer mechanism is configured to execute a dynamic extension profile, which implements a standard protocol that enables the client to acquire any profile the client needs at the time the profile is needed.

25. The apparatus of claim 19,
wherein the discovery mechanism uses the Bluetooth Service Discovery Protocol (SDP); and
wherein the client and the service provider of the new service communicate using the Bluetooth networking standard.

26. The apparatus of claim 19, wherein the service profile can define a service-specific Application Programming Interface (API).

27. The apparatus of claim 19, wherein the service profile implements a domain-specific protocol stack associated with the new service.

28. A device configured to dynamically deliver a service profile to a client to enable the client to use a service provided by the device, comprising:
the device configured to provide the service;
a memory within the device containing the service profile that enables clients to use the service provided by the device;
a service profile obtaining mechanism configured to cause the client to obtain the service profile by:
causing the client to send a request for the service profile to the device, wherein the request includes type information identifying the type of device platform of the client; and
causing the device to select the service profile from a set of service profiles based on the received type information of the client; and
a profile transfer mechanism configured on the device to transfer the service profile to the client on demand,
wherein the service profile includes a specification that describes how to use the new service, and wherein causing the service profile to be installed on the client involves,
causing device-specific code to be generated to implement the specification, and
causing the code to be installed on the client;
wherein the service profile is a dynamic extension profile, which provides commands that:
allow the client to query the service provider to determine which service profiles are available on the service provider; and
transfer the service profile from the service provider to the client.

29. The device of claim 28, further comprising a discovery mechanism configured to perform a discovery operation that allows devices to discover each other.

* * * * *